United States Patent
Miyake et al.

(10) Patent No.: US 7,459,004 B2
(45) Date of Patent: Dec. 2, 2008

(54) MOUNTING STRUCTURE FOR AIR CLEANER

(75) Inventors: Hitomi Miyake, Miki (JP); Yoshiteru Ueda, Maryville, MO (US); Ichiro Uemura, Kobe (JP); Tetsuhiro Yamakawa, Maryville, MO (US)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 490 days.

(21) Appl. No.: 11/159,866

(22) Filed: Jun. 23, 2005

(65) Prior Publication Data

US 2006/0288672 A1    Dec. 28, 2006

(51) Int. Cl.
*B01D 46/42* (2006.01)
*F02M 35/024* (2006.01)

(52) U.S. Cl. .................. 55/385.3; 55/493; 55/497; 55/502; 55/503; 55/495; 123/198 E; 403/364; 403/374.5

(58) Field of Classification Search ............ 55/385.3, 55/493, 497, 502, 503, 495; 123/198 E; 403/364, 403/374.5
See application file for complete search history.

(56) References Cited

U.S. PATENT DOCUMENTS

| | | | | |
|---|---|---|---|---|
| 5,472,464 A | * | 12/1995 | Mochida | ............ 55/385.3 |
| 5,640,937 A | * | 6/1997 | Slopsema | ............ 123/198 E |
| 5,730,768 A | * | 3/1998 | Kaminaga et al. | .......... 55/385.3 |
| 6,174,343 B1 | * | 1/2001 | Bloomer | ............ 55/385.3 |
| 6,217,627 B1 | * | 4/2001 | Vyskocil et al. | ............ 55/492 |
| 6,383,268 B2 | * | 5/2002 | Oda | ............ 96/134 |
| 6,406,508 B1 | * | 6/2002 | Bloomer | ............ 55/385.3 |
| 6,592,655 B2 | * | 7/2003 | Iriyama et al. | ............ 96/138 |
| 6,726,742 B2 | * | 4/2004 | Arden et al. | ............ 95/1 |
| 6,866,694 B2 | * | 3/2005 | Moreau et al. | ............ 55/385.3 |

FOREIGN PATENT DOCUMENTS

JP          2542160          4/1997

* cited by examiner

*Primary Examiner*—Jason M Greene
*Assistant Examiner*—Minh-Chau T Pham (57) ABSTRACT

A mounting structure for an air cleaner on a combustion engine according to the present invention includes an engine cover (9) for covering at least a portion of the combustion engine (E). The cover (9) includes an air cleaner casing (81) having an opening and an air cleaner cover (83) for covering the opening of the air cleaner casing (81). Flanges (81*f*, 83*f*) are formed in respective joint portions of the air cleaner casing (81) and the air cleaner cover (83). The mounting structure also includes a slider (10) movable between a disengagement position and an engagement position in a direction parallel to the joint portions. This slider (10) when moved to the engagement position connects the flanges (81*f*, 83*f*) of the air cleaner casing (81) and cover (83), but when moved to the disengagement position the slider (10) enables the cover (83) to be released from the casing (81).

17 Claims, 8 Drawing Sheets

MOUNTING STRUCTURE FOR AIR CLEANER

BACKGROUND OF THE INVENTION

1. Field of the Invention

The present invention generally relates to a mounting structure for an air cleaner on a combustion engine of a vertical shaft type that is used as a drive source for a working machine such as a lawn mower.

2. Description of the Prior Art

For a drive source used for driving a lawn mower, a combustion engine of a vertical shaft type is generally employed such as disclosed in the Japanese Utility Model Registration No. 2542160. This type of internal combustion engine includes a crankcase and a crankshaft extending vertically from a bottom region of the crankcase. A top region of the combustion engine is covered by an engine cover. An air cleaner is mounted on the engine cover for purifying an intake air of the engine.

The air cleaner includes an air cleaner casing formed integrally with the engine cover for accommodating a cleaner element and an air cleaner cover for closing an opening of the air cleaner casing. Mounting of the air cleaner cover onto the air cleaner casing is generally carried out by the use of a plurality of thumbscrews.

It has, however, been found that although the use of the thumbscrews is effective to firmly secure the air cleaner cover to the air cleaner casing, removal of the thumbscrews during the replacement of the used cleaner element and/or servicing of the air cleaner itself is rather troublesome and the removed thumbscrews may be lost. Also, in a condition in which the air cleaner cover is mounted on the air cleaner casing, the thumbscrews remain projecting considerably outwardly, degrading the appearance of the air cleaner.

SUMMARY OF THE INVENTION

In view of the foregoing, the present invention is intended to provide an improved mounting structure for an air cleaner, in which an air cleaner cover can be firmly and pleasingly mounted on an air cleaner casing and, also, which is effective to facilitate the removal and mounting of the air cleaner cover at the time of the replacement of the air cleaner element and/or the servicing of the air cleaner.

In order to accomplish the foregoing object, the present invention provides a mounting structure for an air cleaner for use with a combustion engine, which includes an engine cover for covering at least a portion of the combustion engine and having an engine cover body. The engine cover includes an air cleaner casing, provided adjacent the engine cover body and having an opening, and an air cleaner cover for covering the opening of the air cleaner casing. A cleaner element is removably accommodated within the air cleaner casing. Flanges are formed in respective joint portions of the air cleaner casing and the air cleaner cover, which are jointed. The mounting structure also includes a slider movable between a disengagement position and an engagement position in a direction parallel to the joint portions. This slider at the engagement position connects the flanges of the air cleaner casing and the air cleaner cover together, but when moved on the cover body to the disengagement position the slider 10 enables the air cleaner cover to be released from the air cleaner casing.

According to the present invention, the air cleaner cover and the air cleaner casing can easily be coupled together or decoupled from each other by moving the slider in a direction parallel to the joint portions of the air cleaner casing and the air cleaner cover. Accordingly, replacement of the used cleaner element and/or the servicing of the air cleaner itself can be facilitated. Also, since the slider is used to connect together the flanges that are formed respectively in the joint portions of the air cleaner casing and the air cleaner cover, a firm connection can be accomplished. Moreover, since the slider does not protrude outwardly from the air cleaner cover, unlike the thumbscrews, a pleasant appearance can be appreciated. Yet, when the air cleaner cover is removed from the air cleaner casing to carry out the replacement of the cleaner element and/or the servicing of the air cleaner, the slider needs not be removed since the slider can be slid on the cover body to be temporarily held at the disengagement position.

In a preferred embodiment of the present invention, side portions of the air cleaner cover may be coupled to the air cleaner casing by the slider and front and rear portions of the air cleaner cover may be engaged with the air cleaner casing by engagement pawls formed in the front and rear portions of the air cleaner cover.

According to this preferred feature, the air cleaner cover can be coupled or engaged to the air cleaner casing at two locations of the opposite side portions of the air cleaner cover and also at two locations of front and rear portions of the air cleaner cover and, thus, at four locations in total. In other words, since the air cleaner cover can be supported by the air cleaner casing at four sides, the air cleaner cover will not separate from the air cleaner casing even though the air cleaner cover receives an external force from any direction.

In another preferred embodiment of the present invention, the cover body may be formed with a slide engagement on which the slider is slidably mounted, in which case the slider at the engagement position engages with the flanges of the air cleaner and the slide engagement of the cover body.

According to this preferred feature, merely by sliding the slider, the air cleaner cover can be coupled with both the air cleaner casing and the cover body. Accordingly, firm mounting of the air cleaner cover can be accomplished.

In a further preferred embodiment of the present invention, the mounting structure may include a resistance member, which has a stopper function for applying a resistant force to the movement of the slider.

According to this feature, when the slider is to be moved by sliding, the slider can be held at selected position by the stopper function of the resistance member and, therefore, a good operationality can be appreciated. Specifically, when the position of the slider is so determined that when the air cleaner cover is coupled with the air cleaner casing, the slider can straddle over the air cleaner casing or both the cover body and the air cleaner casing, the slider can be held at such determined position owning to the stopper function of the resistance member, making it difficult to be easily released. On the other hand, when the air cleaner cover and the air cleaner casing are decoupled, the slider is moved to the disengagement position and can then be held at a predetermined position on the cover body by the stopper function of the resistance member.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
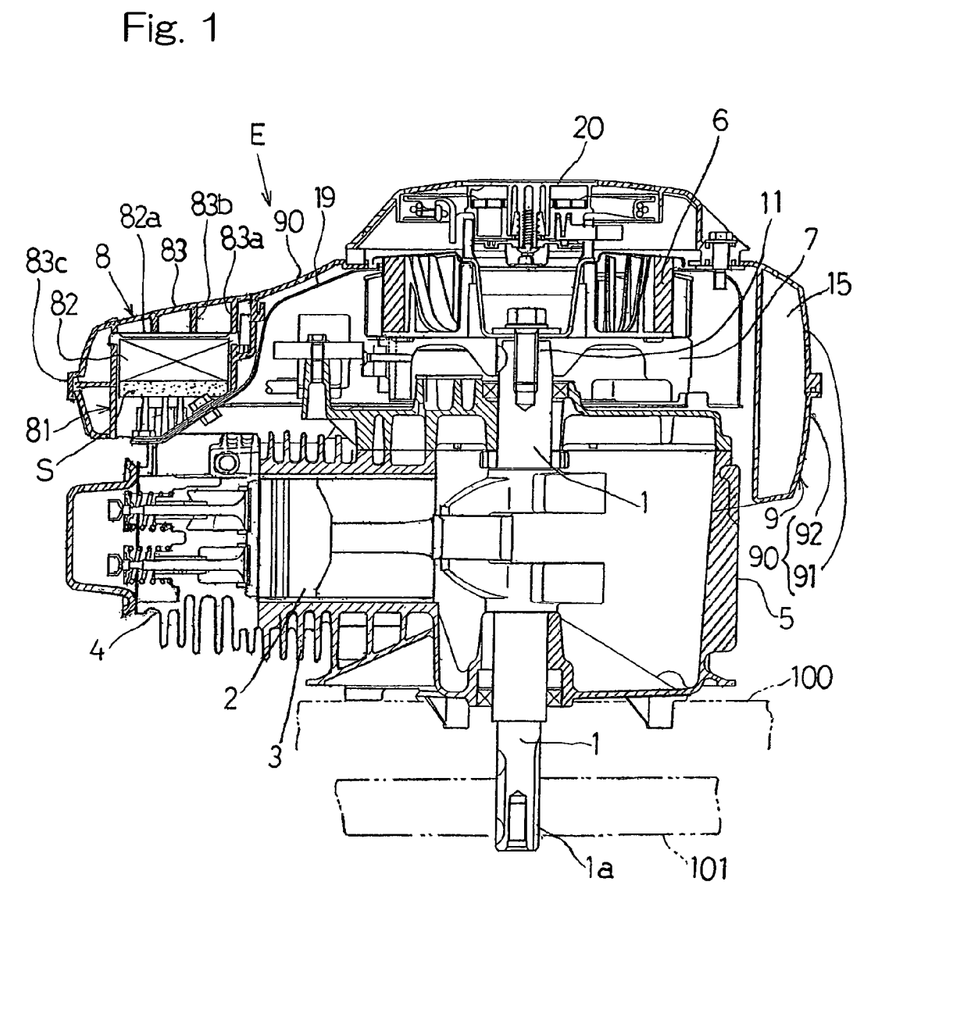
FIG. 1 is a longitudinal sectional view of a combustion engine of a vertical shaft type, in which a mounting structure for an air cleaner according to a preferred embodiment of the present invention is employed.

Reference will now be made to the accompanying drawing for the detailed description of a preferred embodiment of the present invention. As shown in FIG. 1, there is shown a combustion engine E of a vertical shaft type including a crankcase 5 and a crankshaft 1 extending vertically through the crankcase 5. The Engine E also includes a horizontally laid cylinder block 3 formed integrally with the crankcase 5 and having a cylinder bore defined therein. A piston 2 is horizontally arranged within the cylinder bore of the cylinder block 3 for connection with the crankshaft 1 so that the piston 2 can reciprocate horizontally within the cylinder bore of the cylinder block 3. A cylinder head 4 is secured to an open end of the cylinder block 3.

The crankshaft 1 has an upper end 11 protruding upwardly outwardly from the crankcase 5. A cooling fan 6 and a flywheel 7 are mounted on the upper end 11. The crankshaft 1 also has a lower end 1a protruding downwardly outwardly from the crankcase 5. The lower end 1a is utilized as a drive output shaft. Where the combustion engine E is mounted on a working machine, for example, a lawn mower 100, a cutter blade assembly 101 is mounted on the lower end 1a of the crankshaft 1.

A top region of the combustion engine E, that is, a top region of the cylinder block 3, the cylinder head 4 and the crankcase 5 is covered by an engine cover 9 made of a synthetic resin and having an air cleaner 8 and a fuel tank 15 both built therein. This engine cover 9 is fixed to the combustion engine E by a plurality of bolts (not shown). A fan housing 19 is mounted on the engine cover 9 for covering the cooling fan 6 and is operable to introduce a cooling air from the cooling fan 6 towards the cylinder block 3, the cylinder head 4 and the crankcase 5. A recoil starter 20 is mounted on a top portion of the engine cover 9.

Figure 2A:
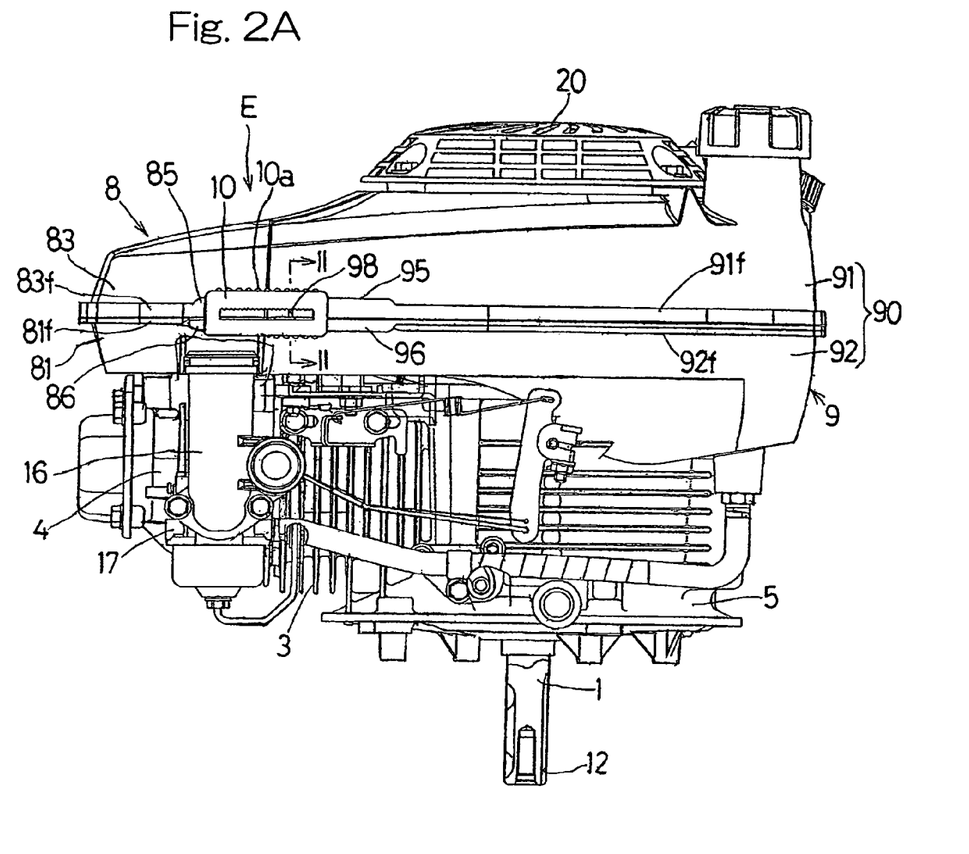
FIG. 2A is a side view of the combustion engine shown in FIG. 1.
Figure 6A:
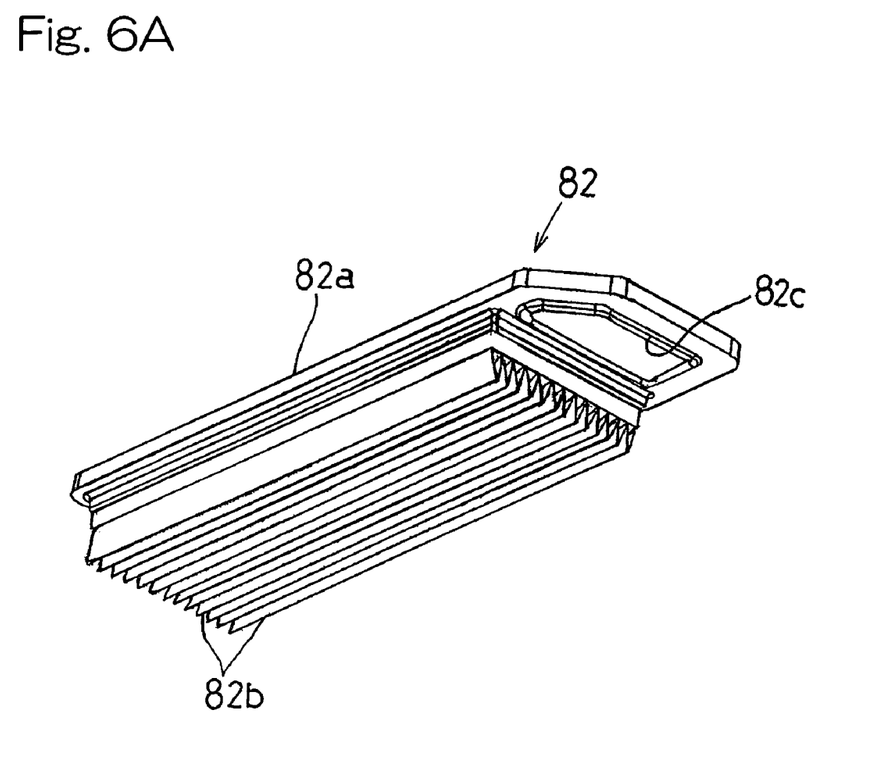
FIG. 6A is a perspective view of an air cleaner element.
Figure 6B:
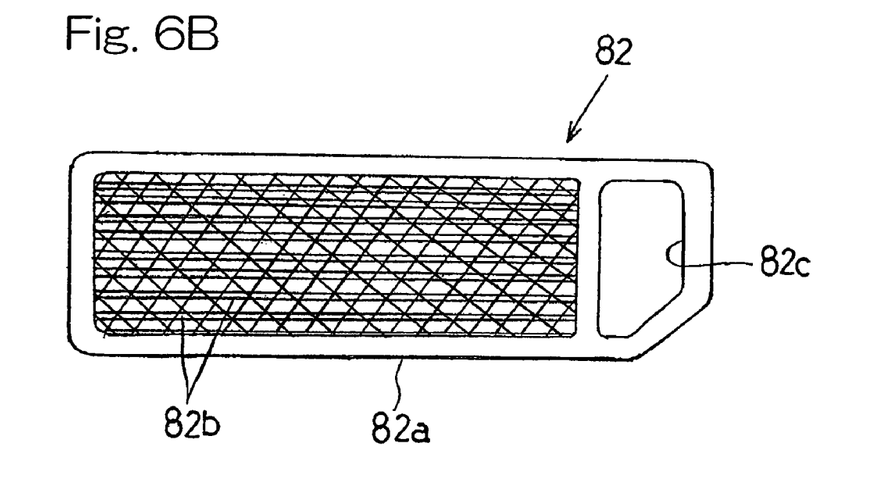
FIG. 6B is a top plan view of the air cleaner element shown in FIG. 6A.

The air cleaner 8 includes an air cleaner casing 81 and an air cleaner cover 83. The air cleaner casing 81 accommodates a cleaner element 82 of, for example, a cartridge type (See FIG. 6.) and is provided adjacent a cover body 90 of the engine cover 9. The air cleaner cover 83 covers a top opening of the air cleaner casing 81. During the operation of the combustion engine E, an air from the outside is introduced into the air cleaner 8 to remove dust and foreign matters contained in the air, so that a purified air can be introduced into a carburetor 17 through an intake tube 16 (FIG. 2).

Figure 4:
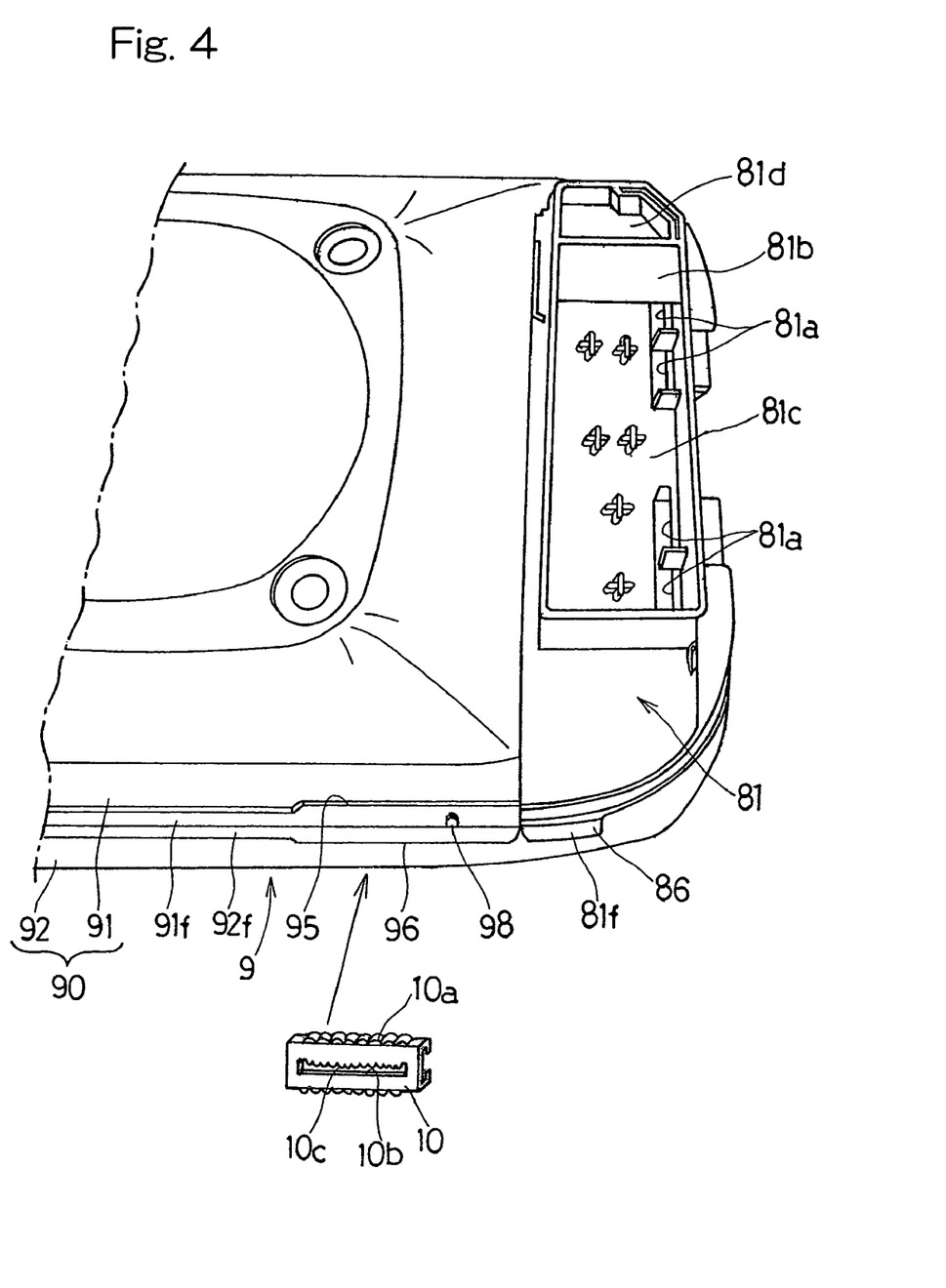
FIG. 4 is a perspective view showing an air cleaner casing with a cover body of the engine in FIG. 1.

As shown in FIG. 4, the air cleaner casing 81 has air intake ports 81a defined in a front bottom portion thereof for introducing an external air into the air cleaner casing 81. The air cleaner casing 81 also has an interior in which an element chamber 81c for accommodating the cleaner element 82 (FIG. 6.) of a generally rectangular configuration when viewed from top and an air discharge chamber 81d for guiding the purified air towards the intake tube 16 (FIG. 4A) are defined by a partition wall 81b. Yet, as shown in FIG. 5, an upright wall 81w of the air cleaner casing 81, which defines a joint with the cover body 90, is formed with left and right engagement grooves 81e and 81e and an intermediate engagement groove 81ee and, on the other hand, a front lower edge of the air cleaner casing 81 is formed with left and right engagements 81g and 81g.

Figure 5:
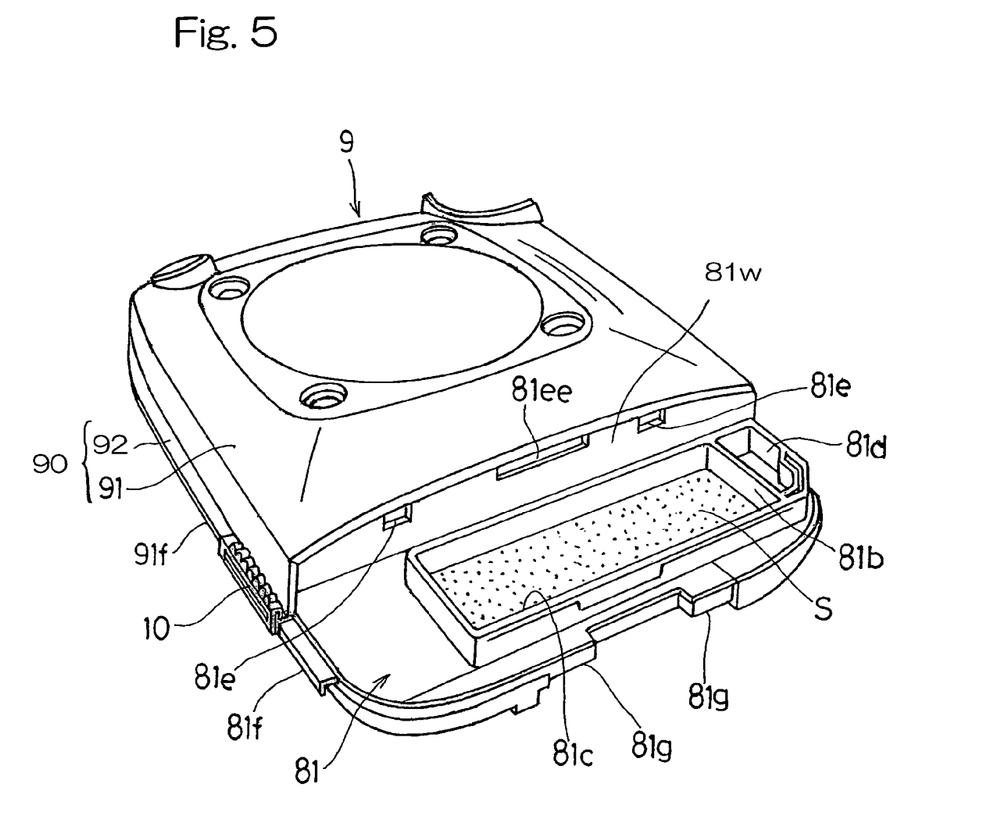
FIG. 5 is an enlarged perspective view of the air cleaner casing.

Also as shown in FIG. 5, an urethane sponge sheet S as a primary element is laid within the element chamber 81c of the air cleaner casing 81, and the cleaner element 82 shown in FIGS. 6A and 6B is placed as a secondary element on the urethane sponge sheet S. This cleaner element 82 is so sized and so shaped as to cover the element chamber 81c and the air discharge chamber 81d. As shown in FIGS. 6A and 6B, the cleaner element 82 includes a holder 82a forming a frame of the cleaner element 82. A plurality of elongated paper filter 82b is supported by the holder 82a. The paper filter 82b is accommodated within the element chamber 81c shown in FIG. 5. A portion of the holder 82a that is aligned with the air discharge chamber 81d shown in FIG. 5 is formed with an opening 82c similar in shape to the air discharge chamber 81d. The air cleaner element 82 is in the form of a filter cartridge and can therefore be easily replaced and handled during the replacement of the used air cleaner element and/or the servicing of the air cleaner 8.

Figure 7A:
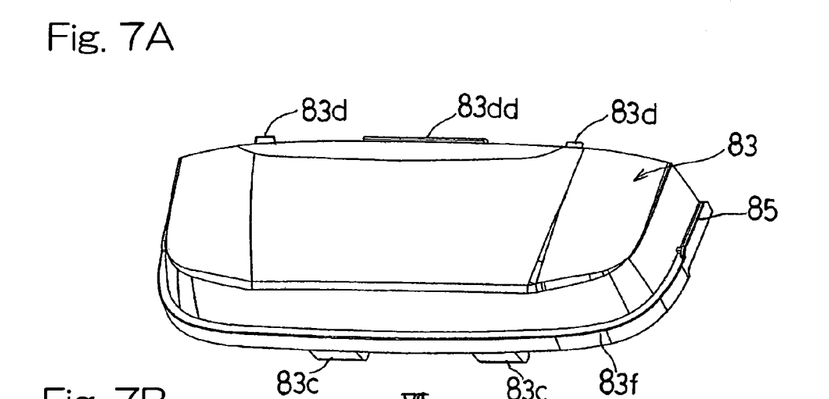
FIG. 7A is a perspective view of an air cleaner cover.
Figure 7B:
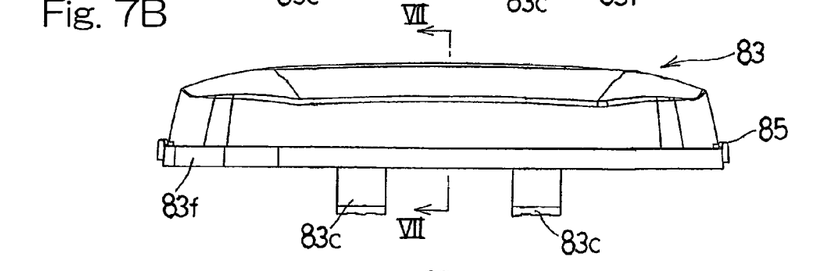
FIG. 7B is a front elevational view of the air cleaner cover.

The air cleaner cover 83 is shown in a perspective view in FIG. 7A. The air cleaner cover 83 is made of a synthetic resin as is the case with the engine cover 9. The air cleaner cover 83 has a front lower edge formed with downwardly extending, left and right front engagement pawls 83c and 83c shown in FIG. 7B and also has a rear upper portion formed with left and right rear engagement pawls 83d and 83d and an intermediate engagement pawl 83dd shown in FIG. 7C.

When the air cleaner cover 83 is mounted onto the air cleaner casing 81, the front engagement pawls 83c and 83c are engaged from below with the corresponding engagements 81g and 81g of the air cleaner casing 81 shown in FIG. 5 and, on the other hand, the rear engagement pawls 83d, 83dd shown in FIG. 7A are engaged in the corresponding engagement grooves 81e and 81ee of the air cleaner casing 81 shown in FIG. 5. Those engagement pawls 83c, 83d and 83dd are formed integrally with the air cleaner cover 83. The engagement pawls 83c and 83c are, as shown in FIG. 7D, so formed as to extend a substantial distance downwardly from the air cleaner cover 83 and have their free ends capable of being elastically deformed a slight angle in a direction P forwardly and rearwardly of the air cleaner 83. Accordingly, this elastic deformation of those engagement pawls 83c and 83c allows the air cleaner casing 81 to be easily engaged with and disengaged from the engagements 81g and 81g.

Figure 7C:
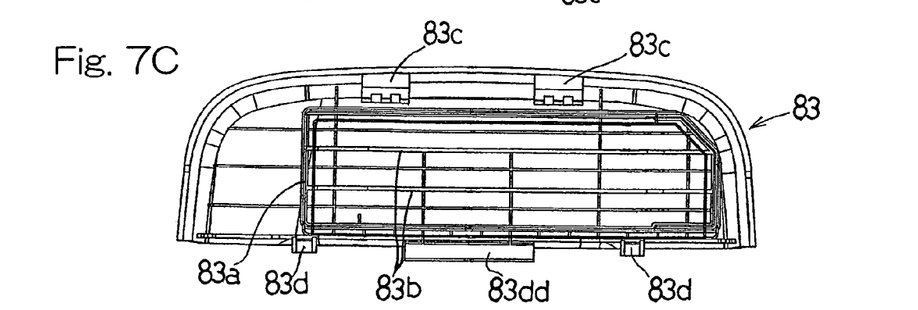
FIG. 7C is a bottom plan view of the air cleaner cover.
Figure 7D:
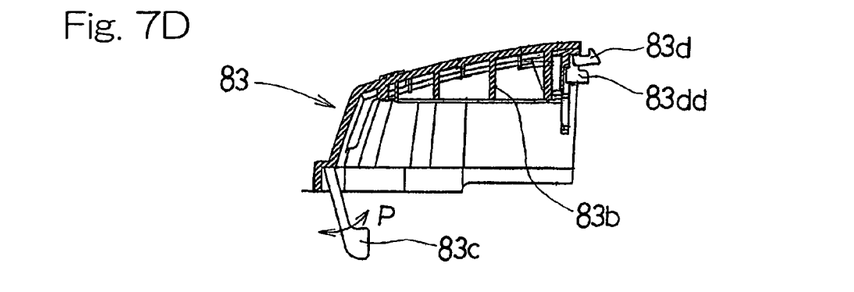
FIG. 7D is a cross-sectional view taken along the line VII-VII in FIG. 7B.

As shown in FIG. 7C, a push projection 83a is formed in an inner surface area of the air cleaner cover 83. This push projection 83a is substantially identical in shape to the holder 82a (FIG. 6B) of the cleaner element 82 and, accordingly, when the air cleaner cover 83 is mounted onto the air cleaner casing 81, the holder 82a can be pressed from above by the push projection 83a. Also, a plurality of air guide plates 83b extending in a lengthwise direction of the cleaner case cover 83 is formed in the inner surface of the air cleaner cover 83 so as to define an air passage through which the purified air can be guided towards the air discharge chamber 81d (FIG. 5) of the air cleaner casing 81.

Figure 2B:
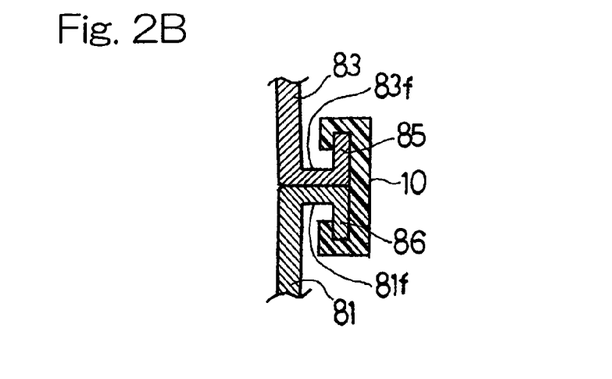
FIG. 2B is an enlarged cross-sectional view taken along the line II-II in FIG. 2A.
Figure 3:
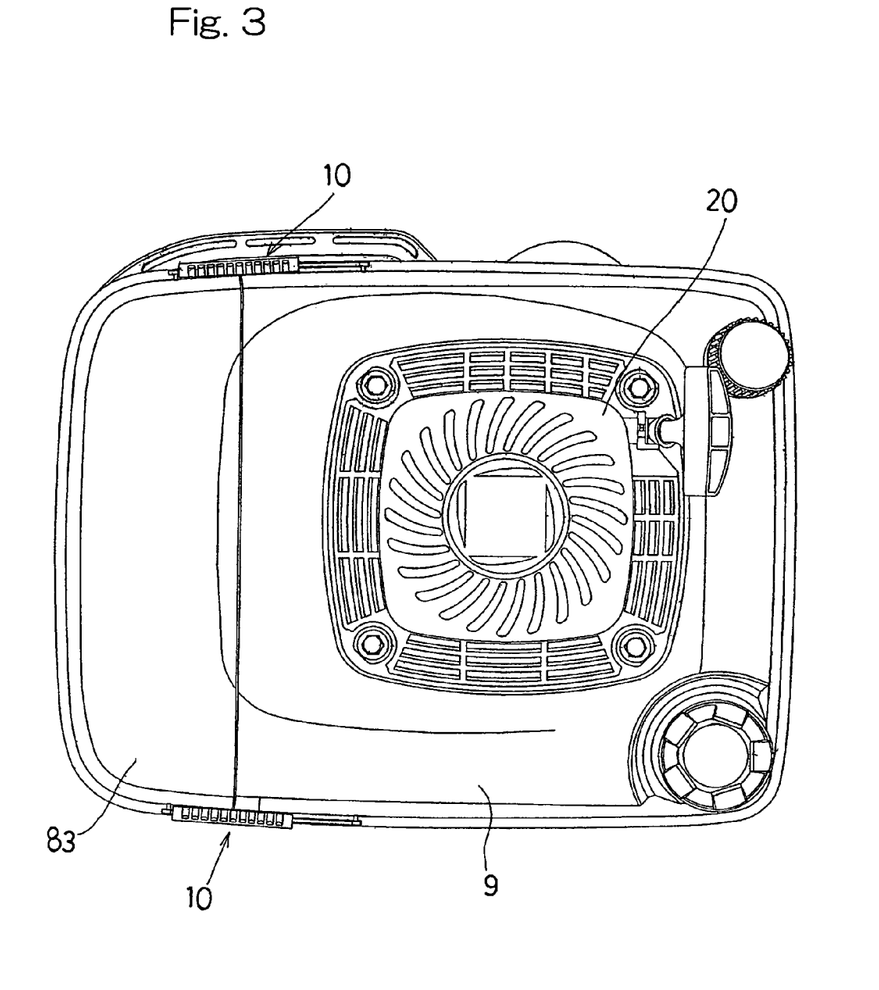
FIG. 3 is a top plan view of the combustion engine shown in FIG. 1.

As shown in FIGS. 2A and 2B, the air cleaner casing 81 has a flange 81f along a joint portion with the cleaner case cover 83 whereas the air cleaner cover 83 has a flange 83f along a joint portion with the air cleaner casing 81. The air cleaner cover 83 can be also mounted on the air cleaner casing 81 by engaging the flanges 81f and 83f with a slider 10 movable in a direction parallel to a joint formed by the joint portions of the air cleaner casing 81 and the air cleaner cover 83. As is clear from the above description, the air cleaner cover 83 is mounted on the air cleaner casing 81 through the engagement pawls 83c, 83d, 83dd and the flanges 81f and 83f.

The cover body 90 is made up of an upper cover half 91 and a lower cover half 92. The lower cover half 92 is formed integrally with the air cleaner casing 81. The upper cover half 91 has a flange 91f along a joint portion with the lower cover half 92 whereas the lower cover half 92 has a flange 92f along a joint portion with the upper cover half 91. The upper cover half 91 and the lower cover half 92 are jointed through the flanges 91f and 92f. The flanges 91f and 92f of the upper and lower cover halves 91 and 92 are formed with upwardly and downwardly oriented upper and lower slide engagements 95 and 96, respectively. Also, a resistance member 98 is formed in the upper slide engagement 95 so as to protrude therefrom in a lateral direction of the cover body 90. As shown in FIGS. 2B and 4, the flange 81f of the air cleaner casing 81 is formed with a downwardly oriented slide engagement 86. The flange 83f of the air cleaner cover 83 shown in FIGS. 2B and 7A is formed with an upwardly oriented slide engagement 85. The slider 10 is engaged with the slide engagements 85 and 86 of the upper and lower flanges 83f and 81f when the air cleaner cover 83 is mounted onto the air cleaner casing 81. The slider 10 also can be engaged with the upper and lower slide engagements 95 and 96 of the cover body 90.

Figure 8:
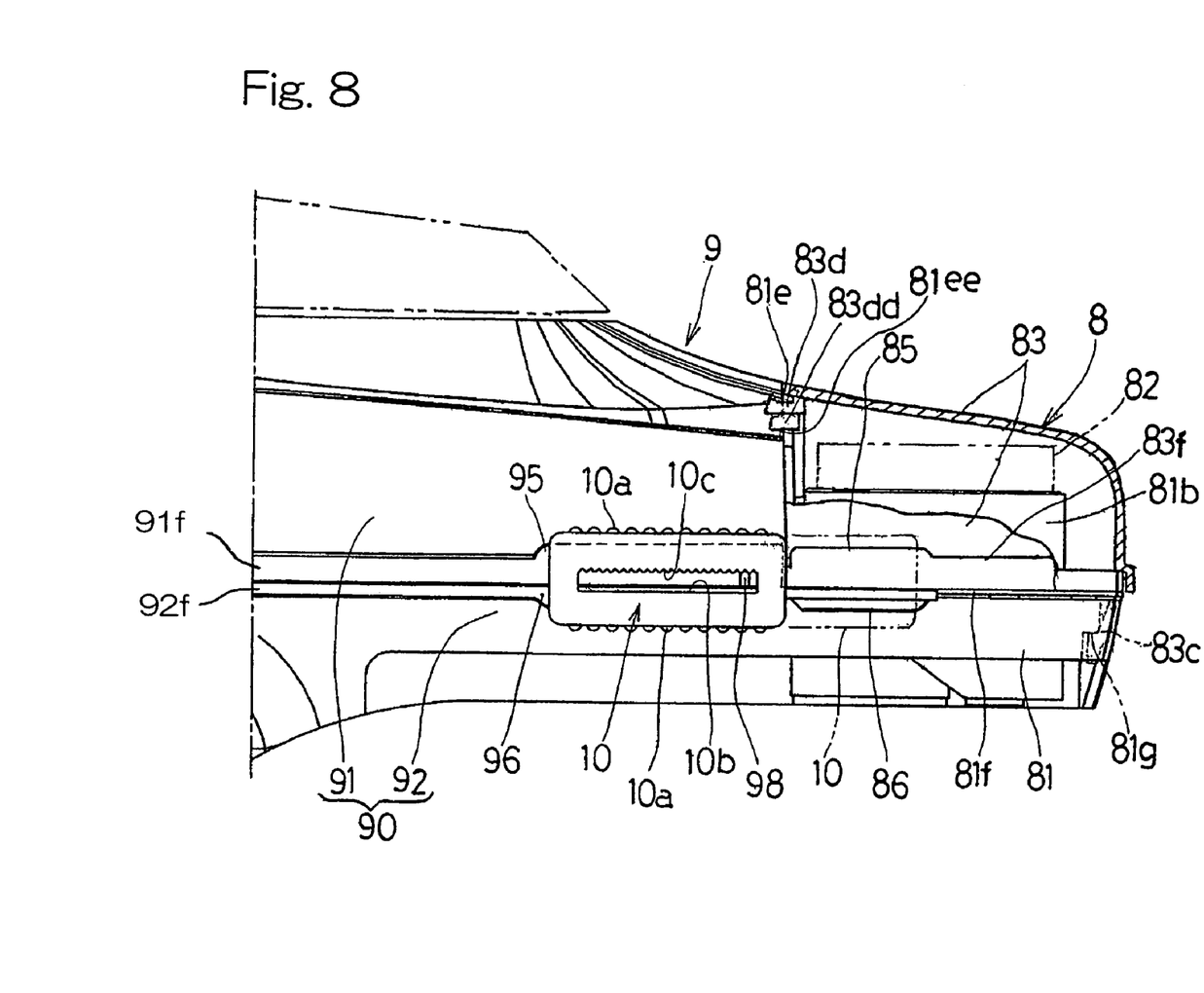
FIG. 8 is an enlarged fragmentary side view of the air cleaner, showing a slider engaged with slide engagements of a cover body, which slider is held at a disengagement position.

Referring to FIG. 8, when the air cleaner casing 81 and the air cleaner cover 83 are to be disengaged from each other, the slider 10 is moved on the cover body 90 to assume a disengagement position where the slider 10 engages only with the slide engagements 95 and 96. In FIG. 8, only one slider 10 is shown, but a similar slider 10 is also provided on the opposite side of the cover body 90 and is at the same time held at the disengagement position. Also, upper and lower faces of the slider 10 are formed with a series of projections 10a to provide a good operationality with which the slider 10 can be manually slid.

When the air cleaner casing 81 and the air cleaner cover 83 are to be coupled together, the slider 10 at the disengagement position is moved forward to an engagement position where the slider 10 straddles over the air cleaner casing 81, the air cleaner cover 83 and the cover body 90 as shown in FIG. 2A. By so positioning, the slider 10 can be engaged with the slide engagements 85 and 86 of the respective flanges 83f and 81f and also with the slide engagements 95 and 96 of the respective flanges 91f and 92f. Thus, when the slider 10 is set to the engagement position, a stabilized connection between the air cleaner casing 81 and the air cleaner cover 83 can be achieved since the air cleaner cover 83 can be supported by both the air cleaner casing 81 and the cover body 91.

The resistance member 98 provided on the upper slide engagement 95 of the flange 91f is used not only to apply a resistance to the sliding movement of the slider 10, but also to restrict the movement of the slider 10 so that the slider 10 can be prevented from separating from the slide engagements 85, 86, 95 and 96. The slider 10 has a guide groove 10b into which the resistance member 98 is inserted. The guide groove 10b has an upper side face formed with a plurality of engagement recesses 10c lining equidistantly in the direction of sliding movement of the slider 10. The resistance member 98 can be selectively engaged with one of the recesses 10c so that the slider 10 can be retained at a desired position along the direction of sliding movement of the slider 10.

During the replacement of the used cleaner element 82 and/or the servicing of the air cleaner 8, the slider 10, then held at the engagement position shown by the double-dotted line where the slider 10 engages with the slide engagements 95 and 96 of the flanges 91f and 92f and the slide engagements 85 and 86 of the flanges 83f and 81f, first has to be slid on the cover body 90 towards the disengagement position shown by the solid line to thereby allow the air cleaner cover 83 to be removable from the air cleaner casing 81. In this condition, the slider 10 remains retained by the cover body 90 through the slide engagements 95 and 96 of the flanges 91f and 92f and will, accordingly, not be lost.

Subsequently, the front lower edge (the right lower edge as viewed in FIG. 8) of the air cleaner cover 83 is pulled upwardly with fingers to disengage the engagement pawls 83c and 83c of the air cleaner cover 83 from the engagement 81g and 81g of the air cleaner casing 81. After this disengagement, the front portion of the air cleaner casing 81 has to be lifted to separate the engagement pawls 83d and 83dd from the corresponding engagement grooves 81e and 81ee to thereby remove the air cleaner cover 83 from the air cleaner casing 81 for the replacement of the used cleaner element 82 and/or the servicing of the air cleaner 8.

After the replacement of the cleaner element 82 and/or the servicing of the air cleaner 8, in order to mount the air cleaner cover 83 on the air cleaner casing 81, the servicing attendant worker should follow a reverse procedure to the removing the air cleaner cover 83 from the air cleaner casing 81. Specifically, the rear engagement pawls 83d and 83dd of the air cleaner cover 83 have to be engaged in the corresponding engagement grooves 81e and 81ee of the air cleaner casing 81 and, then, the rear portion of the air cleaner cover 83 has to be pushed downwardly, followed by pushing the front portion of the air cleaner cover 83 to allow the engagement pawls 83c and 83c to be engaged in the corresponding engagements 81g and 81g while elastically deforming the engagement pawls 83c and 83c outwardly forwardly. By so doing, the air cleaner cover 83 can be fitted to the opening of the air cleaner casing 81. Thereafter, the slide 10 then held at the disengagement position on the cover body 90 has to be slid forwards towards the engagement position at which the slider 10 engages with the engagements 85 and 86 of the flanges 83f and 81f and the slide engagements 95 and 96 of the flanges 91f and 92f, thereby completing the mounting of the air cleaner cover 83 on the air cleaner casing 81.

At this time, since the resistance member 98 comes to be engaged in the engagement recess 10c formed in the upper side face of the guide groove 10b of the slider 10, the movement of the slider 10 is restricted. In other words, when the air cleaner cover 83 and the air cleaner casing 81 are coupled together, the slider 10 is prevented from moving further in the forward direction (leftwards as viewed in FIG. 2A) past the intended engagement position. Also, when the air cleaner cover 83 is removed from the air cleaner casing 81 by moving the slider 10 to the disengagement position in the cover body 90, the slider 10 is prevented from moving past the disengagement position. Also, since the slider 10 is so shaped not to protrude outwardly from the air cleaner cover 83, unlike the thumbscrew employed in the conventional air cleaner, the air cleaner 8 has a pleasant appearance.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A mounting structure for an air cleaner for use with a combustion engine, which comprises:
    an engine cover for covering at least a portion of the combustion engine and having an engine cover body, the engine cover including an air cleaner casing, provided adjacent the engine cover body and having an opening, and an air cleaner cover for covering the opening of the air cleaner casing;
    a cleaner element removably accommodated within the air cleaner casing;
    flanges formed in respective joint portions of the air cleaner casing and the air cleaner cover, which are jointed; and
    a slider movable between a disengagement position and an engagement position in a direction parallel to the joint portions, the slider when moved to the engagement position connecting the flanges of the air cleaner casing and the air cleaner cover together, the slider when moved on the cover body to the disengagement position engaging in its entirety with the engine cover body so as to enable the air cleaner cover to be released from the air cleaner casing.

2. The mounting structure for the air cleaner as claimed in claim 1, wherein side portions of the air cleaner cover are coupled to the air cleaner casing by the slider, and front and rear portions of the air cleaner cover are engaged with the air cleaner casing by engagement pawls formed in the front and rear portions of the air cleaner cover.

3. The mounting structure for the air cleaner as claimed in claim 1, wherein the engine cover body is formed with a slide engagement on which the slider is slidably mounted and wherein when the slider is at the engagement position the slider engages with the flanges of the air cleaner at a portion adjacent the engine cover body and the slide engagement of the cover body.

4. The mounting structure for the air cleaner as claimed in claim 1, further comprising a resistance member having a stopper function for applying a resistant force to the movement of the slider.

5. The mounting structure for the air cleaner as claimed in claim 4, wherein the slider is provided with a guide groove, in which the resistance member is slidably engaged and which is formed with a plurality of engagement recesses, the resistance member being selectively engageable in one of the engagement recesses.

6. The mounting structure for the air cleaner as claimed in claim 1, wherein the engine cover is made of a synthetic resin.

7. The mounting structure for the air cleaner as claimed in claim 1, wherein the combustion engine includes a vertically extending crankshaft and the engine cover covers a top region of the combustion engine.

8. The mounting structure for the air cleaner as claimed in claim 1, wherein the upper and lower faces of the slider are formed with a series of projections.

9. The mounting structure for the air cleaner as claimed in claim 1, wherein the flanges of the air cleaner casing are formed with respective slide engagements protruding in directions opposite to each other, and wherein the slider engages with the slide engagements so as to embrace the slide engagements.

10. The mounting structure for the air cleaner as claimed in claim 5, wherein opposite ends of the guide groove, in a direction of sliding movement of the slider, are defined by respective end walls, and
    wherein the resistance member is abutted with one of the end walls thereby to restrict a sliding movement range of the slider.

11. The mounting structure for the air cleaner as claimed in claim 1, wherein the engine cover body is formed integrally with the air cleaner casing and the air cleaner cover is formed separately from the engine cover body.

12. In a cover member for extending over at least a portion of a combustion engine, the improvement comprising;
    an engine cover member having an integral fuel tank portion and an air cleaner casing portion, the air cleaner casing portion is configured to hold a replaceable air filter element;
    an air cleaner cover member configured to removably engage the air cleaner casing portion, the air cleaner casing portion has a first flange and the air cleaner cover member has a second flange that are configured to be aligned when the air cleaner cover member is operatively mounted on the engine cover member;
    a slider, extending around the first and second flanges, and configured for relative movement to removably attach the air cleaner cover member to the air cleaner casing portion; and
    a third flange member on the engine cover member and aligned with the second flange to enable the slider to be retained on the engine cover member when the slider is moved to a position to release first flange from the slider.

13. The cover member of claim 12 wherein the engine cover member is formed of a resin.

14. The cover member of claim 12 wherein the fist flange and the second flange have a cross sectional L-shape and the slider member has an approximately cross sectional U-shape to capture the first flange and second flange.

15. The cover member of claim 12 wherein the slider includes grooves and the engine cover member includes a resistance member to engage the grooves.

16. In a cover member for extending over at least a portion of a combustion engine, the improvement comprising;
    an engine cover member having an air cleaner casing portion, the air cleaner casing portion is configured to hold a replaceable air filter element;
    an air cleaner cover member configured to removably engage the air cleaner casing portion, the air cleaner casing portion has a first elongated flange and the air cleaner cover member has a second elongated flange that are configured to be aligned when the air cleaner cover member is operatively mounted on the engine cover member;

a slider, extending around the first and second elongated flanges, and configured for relative movement to removably attach the air cleaner cover member to the air cleaner casing portion; and a third flange member on the engine cover member and operatively aligned with the second elongated flange to enable the slider to be retained on the engine cover member when the slider is moved to a position to release the first elongated flange from the slider.

17. The cover member of claim 16 wherein the slider includes grooves and the engine cover member includes a resistance member to engage the grooves.

* * * * *